Patented May 5, 1925.

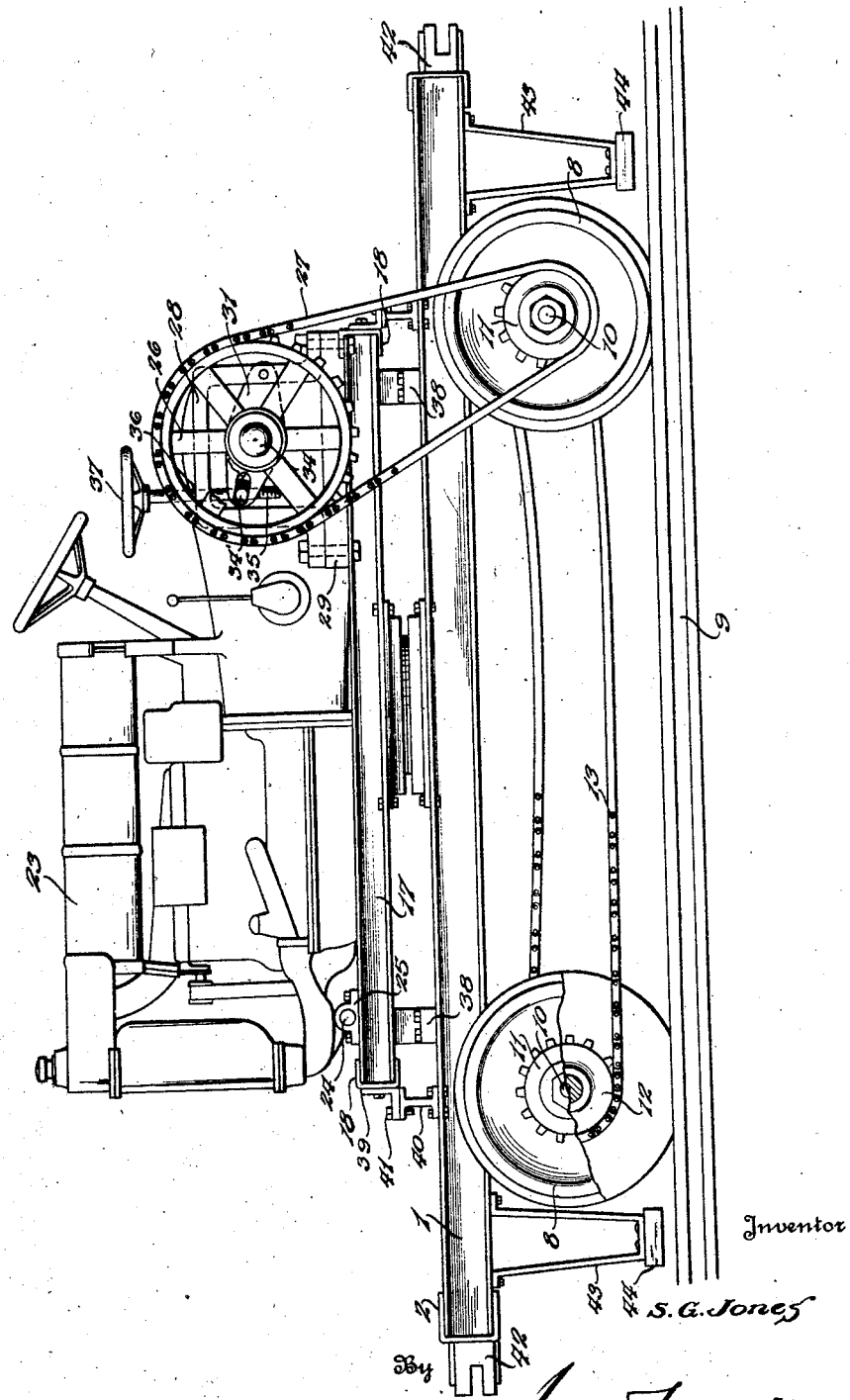

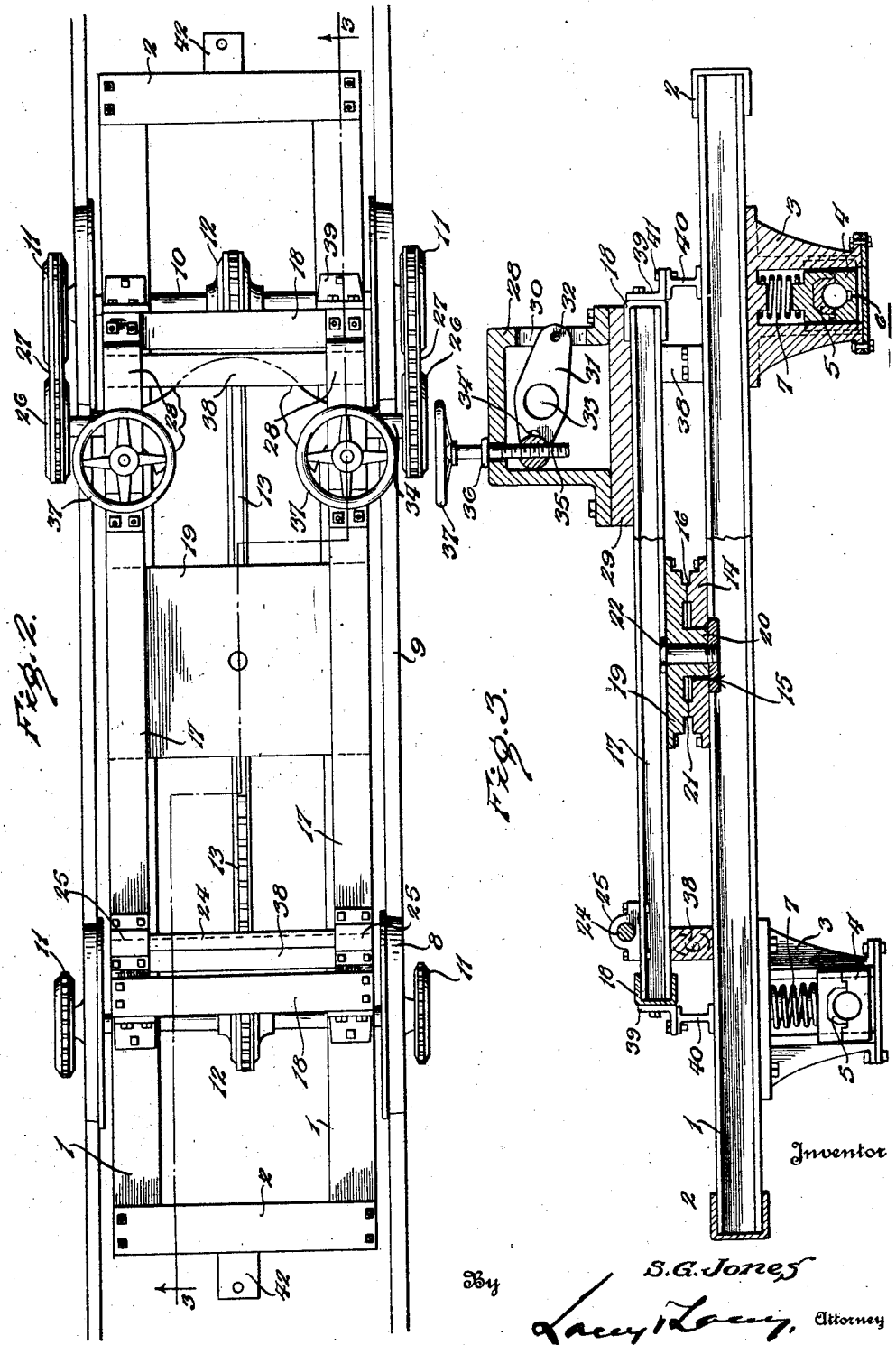

1,536,864

UNITED STATES PATENT OFFICE.

SAMUEL G. JONES, OF NORFOLK, VIRGINIA.

TRACTOR LOCOMOTIVE.

Application filed April 25, 1924. Serial No. 708,925.

*To all whom it may concern:*

Be it known that I, SAMUEL G. JONES, a citizen of the United States, residing at Norfolk, in the county of Norfolk and State of Virginia, have invented certain new and useful Improvements in Tractor Locomotives, of which the following is a specification.

My present invention has for its primary object the provision of novel means whereby the power of an ordinary farm tractor may be utilized for propelling cars such as are used for hauling logs from lumber camps and in similar places and under similar conditions. The invention seeks particularly to provide a novel mounting for the tractor whereby it may be very easily and quickly reversed so that the train of cars may be driven in either direction although the driving mechanism of the tractor may be operated in its forward travel position. Another object of the invention is to provide novel means whereby the power of the tractor may be transmitted to the wheels of the truck or locomotive, and other objects of the invention will appear incidentally in the course of the following description. The invention resides in certain novel features which will be particularly pointed out in the appended claims.

In the accompanying drawings:

Figure 1 is a side elevation, partly broken away, of an apparatus embodying my improvements;

Fig. 2 is a plan view with the tractor removed, a portion of the transmission housing of the tractor being indicated in its operative position;

Fig. 3 is a longitudinal section on the irregular line 3—3 of Fig. 2.

In carrying out my invention, I employ a truck consisting of sills 1 and cross bars 2 connecting the ends of the sills, which sills and cross bars may be of any preferred design and will generally be constructed of channel bars and I or H beams. To the under sides of the sills 1, I secure the pedestals 3 in which are mounted for vertical sliding movement journal boxes 4 including the brasses 5 and oil chambers 6. Springs 7 are housed within the pedestals between the upper sides of the respective journal boxes and the tops of the pedestals so that the journal boxes will be yieldably held to the lower ends of the pedestals and the wheels 8 of the truck held to the track 9 notwithstanding irregularities in the track or oscillation of the truck. The wheels 8 are of the usual flanged car wheel type and secured fixedly to the axles 10 which extend transversely of the truck and are fitted in the journal boxes in the usual manner. Upon the ends of each axle, I secure sprockets 11 and at the center of each axle I secure thereto a sprocket 12, a chain 13 being trained around the said sprockets 12 so that the two axles will be caused to rotate in unison.

At the center of the truck, I secure to the sills 1 a frame or plate 14 which extends between the sills and is provided with a central opening 15 and also upon its upper side with a rib or bearing flange 16 concentric with the said opening. A super-frame consisting of sills or side beams 17 and cross beams 18 connecting the ends of the side sills is disposed above the truck frame, the sills and beams 17 and 18 corresponding to the sills and beams 1 and 2, respectively. To the under sides of the side sills 17 and bridging the space between them, I secure a turntable or bearing plate 19 which is provided centrally with a depending stud 20 fitting loosely through the opening 15 in the lower bearing plate 14. An annular rib or bearing flange 21 is formed upon the under side of the plate 19 concentric with the said stud and adapted to rest upon the mating rib 16 on the bearing plate 14, as shown clearly in Fig. 3, an effective fifth wheel being thus produced so that the upper frame may be shifted pivotally relative to the lower frame but at the same time excessive lateral oscillation of the upper frame will be avoided. A king bolt 22 is fitted through the fifth wheel so as to restrain vertical separating movement of the members thereof and retain the concentric relation of the same.

The tractor, indicated conventionally at 23, is carried by the upper frame and is disposed between the side beams or sills 17 thereof. The front end of the tractor is supported on the said beams or sills by a pivot bar or studs 24 extending laterally from the tractor and engaged in bearings 25 provided therefor upon the sills at the front ends thereof. When the tractor is to be mounted upon the super-frame, the rear ground wheels of the tractor are removed and driving sprocket wheels 26 are secured upon the ends of the rear axle in place of the ground wheels so as to provide means for utilizing the power of the tractor engine, sprocket chains 27 being trained around the said sprockets 26 and the sprockets 11 secured upon the rear axle of the truck. To support the rear axle of the tractor, I provide the frames 28 which consist substantially of inverted U-shaped bars or yokes secured rigidly upon the upper sides of the beams 17 at the rear end thereof and providing an open space through which the ends of the axle may project. If preferred, a base block 29 may be secured upon the beams 17 to reinforce the structure and the said base blocks may be provided in various heights so that the frames 28 may be easily set to the normal positions of tractors. The rear vertical side of each frame or yoke 28 is provided with a slot 30 and a bearing arm 31 has its rear end pivoted within the said slot, as indicated at 32. The said arm is provided between its ends with an opening 33 which receives the adjacent end of the rear axle 34 of the tractor, and in the front end of the arm is pivotally mounted a collar or nut 34' which has threaded engagement with the lower end of an adjusting stem or rod 35 extending upwardly through the top of the yoke or frame 28 and provided with an annular shoulder or rest 36 which bears upon the top of the frame, as shown in Fig. 3. The stem or adjusting rod 35 is equipped with a hand wheel 37 at its upper end, and it will be readily understood that, by rotating the hand wheel and the stem in the proper direction, the front end of the bearing arm or lever 31 will be caused to move upwardly or downwardly and the axle 34 thus shifted so that the driving chain 27 will be placed under the proper tension to effectively transmit the motion of the sprocket wheel 26 to the sprocket 11. It will be noted that the adjusting rods 35 and the cooperating elements are duplicated, one set being provided at each side of the machine so that the power will be transmitted to both ends of the rear axle and thereby most advantageously applied to the truck.

To overcome possible rocking movement of the tractor and the upper frame during operation, I provide the rests or supporting blocks 38 which are secured upon the truck at such points that they will lie under the ends of the super-frame when the latter is in working position, the ends of the beams 17 resting upon the said blocks 38, as shown in Figs. 1 and 3. I also secure to the corners of the super-frame brackets 39 which are arranged to overlie posts 40 secured upon the beams 1, locking pins or bolts 41 being inserted through alined openings in the said brackets 39 and posts 40 to lock the super-frame against pivotal movement when the apparatus is in use.

A drawhead or coupling 42 is provided at each end of the truck, and this coupling may be of any known or approved type. In use, the cars to be hauled are coupled together in a train and the train coupled to that end of the truck which, for the time being, is the rear end and the tractor is disposed so that it will be arranged in the same manner that it would be arranged to travel forwardly in ordinary use. It will be readily noted that the front end of the tractor is pivotally mounted upon the super-frame so that the tractor may have movement in a vertical plane while the rear end is supported by the bearing arms or levers 31 within the yokes or frames 28. When the engine of the tractor is started and permitted to run, motion and power will be transmitted therefrom directly to the rear axle of the tractor in the usual manner, and this motion and power will be transmitted through the sprockets 26 and chains 27 to the rear sprockets 11 so that the truck will be caused to travel forwardly. When the train of cars has been moved to the point of discharge, the tractor can be very quickly reversed so that the cars may be driven upon a return trip. To effect the reversal of the tractor, the locking pins 41 are withdrawn, the adjusting rods 35 are rotated so as to swing the levers or bearing arms 31 downwardly to a sufficient extent to slacken the chains 27 and permit them to be disengaged from the sprockets 11. The super-frame with the tractor thereon is then rotated in a horizontal plane about the fifth wheel so that the front end of the tractor will be presented to that end of the truck which was previously the rear end thereof. The chains 27 are then engaged with the adjacent sprockets 11 and the locking pins 41 restored, whereupon the apparatus will be ready for the return trip.

If desired, brackets 43 may be secured to and depend from the sills 1 near the ends thereof and carry a cross beam 44, as shown in Fig. 1, so that, should the locomotive jump the track, it will slide on the rails instead of running on the ties.

The engine of the tractor is operated in exactly the same manner that it is operated to propel the tractor in its usual field of operations and no change in the construction or arrangement of any of the parts of the tractor is necessary, except so far as the removal of the ground wheels of the tractor may be considered an alteration. The invention provides a very economical means for hauling cars in lumber camps or in manufacturing plants or other places and the trucks may be of such dimensions that they will be fitted to run upon narrow gage tracks or upon standard gage tracks as may be desired.

Having thus described the invention, I claim:

1. An apparatus for the purpose set forth comprising a wheeled-truck, a super-frame mounted upon the truck for pivotal movement about a vertical axis, means for securing a tractor upon the super-frame, means for operatively connecting the rear axle of the tractor with an axle of the truck, and means for vertically adjusting the rear axle of the tractor relative to the super-frame whereby to set the same in working position or bring it into an inoperative position to permit reversal of the tractor and the super-frame.

2. In an apparatus for the purpose set forth, the combination of a wheel-supported truck, a super-frame disposed above the truck, a fifth wheel pivotally connecting the truck and the super-frame at the centers thereof, means at the ends of the super-frame for locking the same to the truck, and fixed supports upon the truck under the ends of the super-frame.

3. In an apparatus for the purpose set forth, the combination of a wheel-supported truck, a super-frame mounted on the truck and relatively reversible, a tractor pivotally mounted at its front end upon the super-frame, and means for operatively connecting the rear end of the tractor with wheels of the truck.

4. In an apparatus for the purpose set forth, the combination of a wheel-supported truck, a super-frame mounted upon the truck and relatively reversible, a tractor pivotally mounted at its front end upon the super-frame, operative connections between the rear axle of the tractor and wheels of the truck, yokes erected on the super-frame adjacent the rear axle of the tractor, bearing arms pivotally mounted in the said yokes and fitting around and supporting the rear axle of the tractor, and means carried by the yokes for vertically adjusting the said arms.

5. In an apparatus for the purpose set forth, the combination of a wheel-supported truck, a super-frame mounted on the truck and relatively reversible, a tractor pivotally mounted at its front end upon the super-frame, sprocket wheels secured upon the rear axle of the tractor, chain and sprocket connections between said wheels and an axle of the truck, and means carried by the super-frame and engaging the rear axle of the tractor to tension the said chains.

6. In an apparatus for the purpose set forth, the combination of a wheel-supported truck, a super-frame mounted thereon, a tractor pivotally mounted at its front end upon the super-frame, supports upon the rear end of the super-frame adjacent the rear axle of the tractor, chain and sprocket connections between the rear axle of the tractor and an axle of the truck, bearing arms pivotally mounted at one end upon the said supports and having their intermediate portions engaging around the rear axle of the tractor, adjusting rods mounted in the said supports, and nuts pivotally carried by the free ends of the said bearing arms and having threaded engagement with the said adjusting rods.

In testimony whereof I affix my signature.

SAMUEL G. JONES. [L. S.]